(12) United States Patent
Nakamura

(10) Patent No.: US 7,030,510 B2
(45) Date of Patent: Apr. 18, 2006

(54) POWER-SUPPLY CONTROL APPARATUS

(75) Inventor: Yoshihito Nakamura, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 596 days.

(21) Appl. No.: 10/365,389

(22) Filed: Feb. 13, 2003

(65) Prior Publication Data
US 2003/0155812 A1 Aug. 21, 2003

(30) Foreign Application Priority Data
Feb. 15, 2002 (JP) .............................. 2002-039085

(51) Int. Cl.
G08B 1/08 (2006.01)

(52) U.S. Cl. ...................... 307/10.1; 70/275; 713/300; 713/320; 713/323

(58) Field of Classification Search ................ 307/10.1
See application file for complete search history.

(56) References Cited

U.S. PATENT DOCUMENTS 5,617,082 A * 4/1997 Denison et al. ............ 340/5.22

FOREIGN PATENT DOCUMENTS

| JP | 2-84028 | 3/1990 |
|---|---|---|
| JP | 7-46826 | 2/1995 |
| JP | 2001-268787 | 9/2001 |

* cited by examiner

Primary Examiner—Brian Sircus
Assistant Examiner—Dru Parries
(74) Attorney, Agent, or Firm—Oblon, Spivak, McClelland, Maier & Neustadt, P.C.

(57) ABSTRACT

A power-supply apparatus is disclosed, which comprises an input terminal, a signal-detecting circuit which receives a drive power from a battery and which detects a signal input to the input terminal, a constant-current-source circuit which receives a drive power from the battery, which is activated by the signal detected by the signal-detecting circuit and which self-holds an operation state, a main power-supply circuit which receives a drive power from the battery and which operates to output a constant voltage, upon receiving a current from the constant-current-source circuit, and a reset circuit which turns off the constant-current-source circuit upon receiving a reset signal.

15 Claims, 3 Drawing Sheets

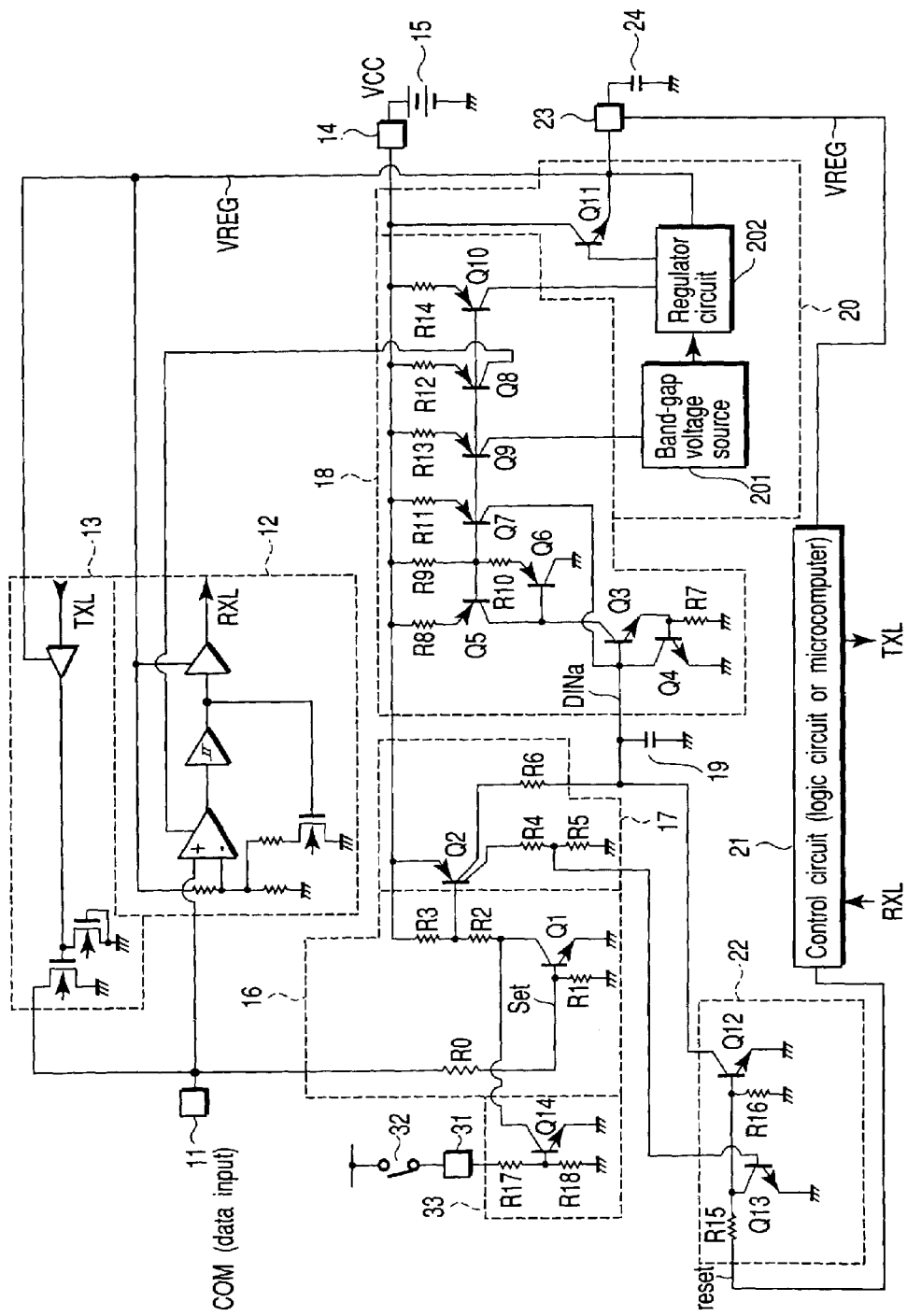
F I G. 3

POWER-SUPPLY CONTROL APPARATUS

CROSS-REFERENCE TO RELATED APPLICATIONS

This application is based upon and claims the benefit of priority from the prior Japanese Patent Application No. 2002-039085, filed Feb. 15, 2002, the entire contents of which are incorporated herein by reference.

BACKGROUND OF THE INVENTION

1. Field of the Invention

This invention relates to a power-supply control apparatus. More particularly, it relates to an apparatus that uses a battery or the like to provide a main power supply. The apparatus is designed for use in, for example, apparatuses for locking and unlocking the doors of automobiles.

2. Description of the Related Art

In conventional apparatuses that use a battery, providing a main power supply and a backup power supply required for controlling the apparatus, the main power supply is turned off in the standby mode in order to save the battery power. Such an apparatus comprises a signal-detecting circuit and a control circuit. The signal-detecting circuit detects a signal that changes the operating mode back to the operation mode from the standby mode to the operation mode. The control circuit activates the main power supply. In the standby mode, both circuits are driven by the backup power supply generated from the battery power supply. Hence, the battery power must be consumed in the standby mode.

A conventional power-supply control apparatus used in apparatuses that lock and unlock the doors of automobiles will be described in detail.

To get into a car, the user first inserts the key into the key slot in the door beside the driver's seat. When the user turns the key, the door-lock motor is driven, unlocking that door. The doors can therefore be opened.

When the door is thus unlocked, the engine remains stopped. So does the generator. Thus the battery is used to drive the motor-lock motor to open the door without supply of an electric current from the generator. The battery is used to drive the door-unlock motor to open the door. Inevitably, the battery power is consumed.

Moreover, power is always supplied from the backup power supply to the signal-detecting circuit so that the circuit may detect a signal for changing the operating mode back to the operation mode from the standby mode to the operation mode, no matter when the signal comes. Also, power is always supplied from the backup power supply to the door-unlock motor control circuit. Hence, the battery power is consumed even when the door-unlock motor is not driven to open the door.

Recently, intra-vehicle LAN (Local Area Network) and the like come into common use. The consumption of the battery power inevitably increases. This is a great problem.

As described above, the conventional apparatus that locks and unlocks the doors of automobiles fast consumes the battery power when the door-unlock motor is driven to open the doors, when the signal detecting circuit operates before the doors are open and when a circuit operates to control the door-unlock motor.

BRIEF SUMMARY OF THE INVENTION

According to an aspect of the present invention, there is provided a power-supply apparatus comprising an input terminal; a signal-detecting circuit which receives a drive power from a battery and which detects a signal input to the input terminal; a constant-current-source circuit which receives a drive power from the battery, which is activated by the signal detected by the signal-detecting circuit and which self-holds an operation state; a main power-supply circuit which receives a drive power from the battery and which operates to output a constant voltage, upon receiving a current from the constant-current-source circuit; and a reset circuit which turns off the constant-current-source circuit upon receiving a reset signal.

BRIEF DESCRIPTION OF THE SEVERAL VIEWS OF THE DRAWING

FIG. 3 is a circuit diagram depicting a modification of the power-supply control apparatus shown in FIG. 1.

DETAILED DESCRIPTION OF THE INVENTION

An embodiment of this invention will be described in detail, with reference to the accompanying drawings.

<Embodiment>

Figure 1:
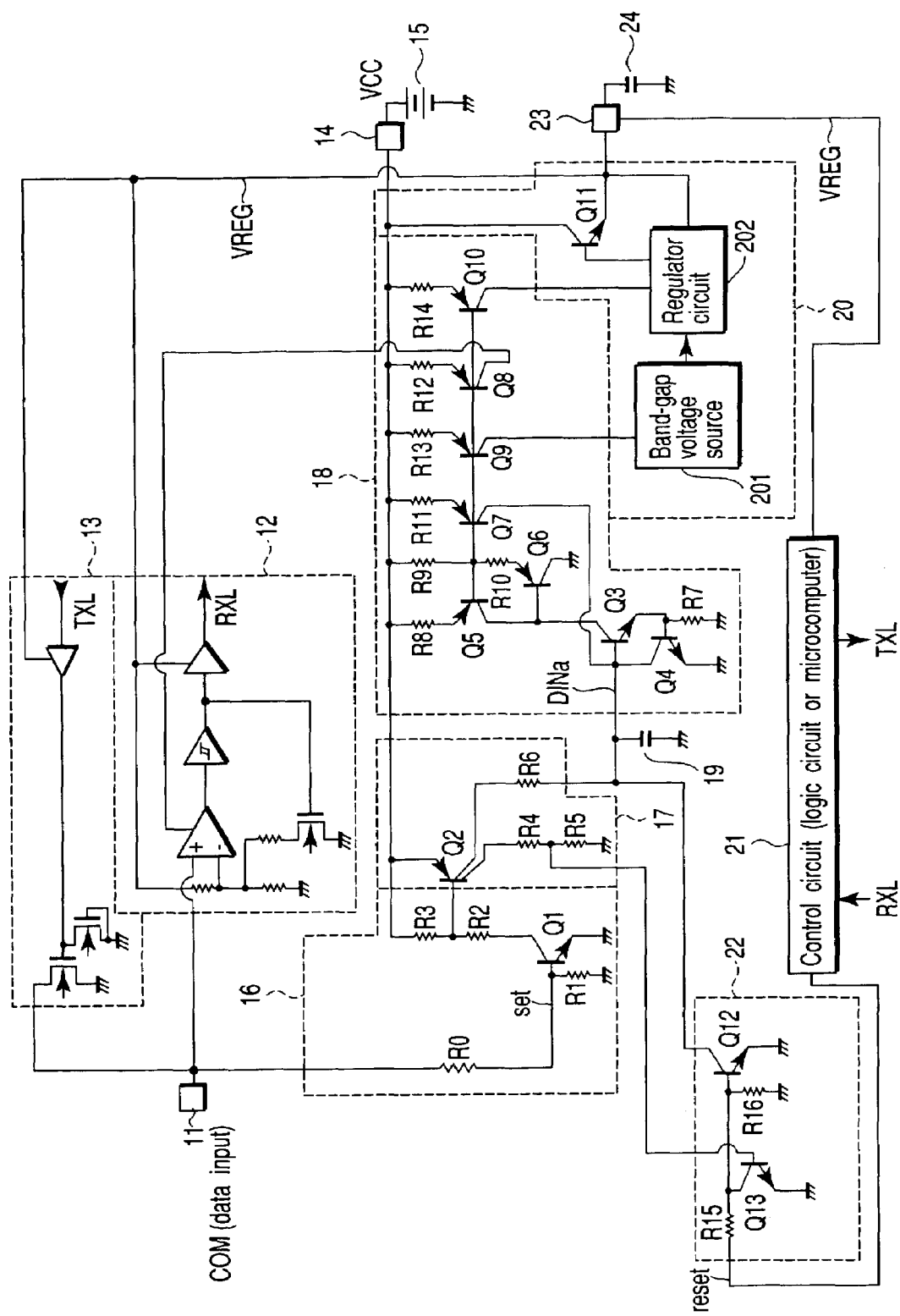
FIG. 1 is a circuit diagram showing a power-supply control apparatus according to an embodiment of the invention.

FIG. 1 shows a power-supply control apparatus that is an embodiment of the invention. The apparatus is designed for use in apparatuses for locking and unlocking the doors of automobiles. The power-supply control apparatus has an electric circuit that is partly or entirely a semiconductor integrated circuit.

As FIG. 1 shows, the power-supply control apparatus comprises an input terminal 11, a serial-data-receiving circuit 12 for receiving and reproducing an external serial data input via the input terminal 11, a serial-data-transferring circuit 13, and a power supply terminal 14. The serial-data-receiving circuit 12 and the serial-data-transferring circuit 13 are connected to the input terminal 11. A battery 15 (external power supply), for example, a 13.5 V vehicle battery, is connected to the power supply terminal 14.

The power-supply control apparatus further comprises a signal-detecting circuit 16, a buffer circuit 17, a constant-current-source circuit 18, a bypass capacitor 19, a main power-supply circuit 20, a control circuit 21, and a reset circuit 22.

The signal-detecting circuit 16 receives power from the battery 15 that is connected to the power supply terminal 14. The circuit 16 detects a pulse signal (in this example, serial data COM for data communication) supplied from an external device to the input terminal 11, as an input signal "set".

The buffer circuit 17 is driven by power supplied from the battery 15 that is connected to the power supply terminal 14. Thus driven, the circuit 17 amplifies the output of the signal-detecting circuit 16.

The constant-current-source circuit 18 receives power from the battery 15 that is connected to the power supply terminal 14. Once activated by the output of the buffer circuit 17, it self holds the operation state. The bypass capacitor 19 is provided between, and connected to, the ground node and the activating input node DINa of the current-source circuit 18. The capacitor 19 absorbs an instantaneous input to the constant-current-source circuit 18.

The main power-supply circuit 20 receives power from the battery 15 that is connected to the power supply terminal 14. When activated by the output current of the constant-current-source circuit 18, the circuit 20 outputs a constant voltage VREG of, for example, 5 V. The constant voltage VREG is lower than the voltage VCC that the battery 15 has.

The constant voltage applied from the main power-supply circuit 20 drives the control circuit 21. The control circuit 21 includes a logic circuit or a microcomputer. When the control circuit 21 receives data RXL (containing a door-unlock command) from the serial-data-receiving circuit 12, it generates a door-unlock signal and outputs a reset signal "reset" after generating the door-unlock signal. The opening signal is supplied to a door-opening motor (not shown). The control circuit 21 generates data TXL, which is supplied to the serial-data-transferring circuit 13.

The reset circuit 22 turns off the constant-current-source circuit 18 when it receives the reset signal from the control circuit 21. The main power-supply circuit 20 is therefore turned off.

A part of the apparatus shown in FIG. 1 will be described in greater detail.

The signal-detecting circuit 16 comprises resistors R0 to R3 and an NPN transistor Q1. In the circuit 16, the input signal is supplied via the resistor RO to the base of the NPN transistor Q1. The base of the transistor Q1 is connected to the ground node by the resistor R1. The collector of the transistor Q1 is connected to the power supply terminal 14 by the resistors R2 and R3 that are connected in series to each other.

While the power-supply control apparatus stays in the standby mode, the signal detected by the signal-detecting circuit 16 remains at such a low potential as would not turn on the NPN transistor Q1. Hence, the NPN transistor Q1 consumes no power at all. As the signal rises from 0 V to a higher potential, the potential of the base of the NPN transistor Q1 rises, too. As a result, the NPN transistor Q1 is turned on. Note that the conventional signal-detecting circuit comprises a comparator and a CMOS Schmidt trigger buffer and uses a backup power supply to drive the comparator or the trigger buffer.

The buffer circuit 17 comprises a PNP transistor Q2 and resistors R4 to R6. The PNP transistor Q2 has its base connected to the node of the resistors R2 and R3 that are provided in series in the signal-detecting circuit 16. The emitter of the PNP transistor Q2 is connected to the power supply terminal 14. The PNP transistor Q2 is one of multi-collector structure and has two collectors in this example. The first collector is connected to the ground node by the resistors R4 and R5 that are connected in series. The second collector is connected to one end of the resistor R6.

The constant-current-source circuit 18 comprises NPN transistors Q3 and Q4, PNP transistors Q5 to Q10, and resistors R7-R14. The NPN transistor Q3 is an input transistor for activation. The NPN transistor Q3 is connected to the other end of the resistor R6. The resistor R6 connects the base of the NPN transistor Q3 to the second collector of the transistor Q2 incorporated in the buffer circuit 17. The resistor R7 is provided between and connected to the emitter of the NPN transistor Q3 and the ground node. The PNP transistor Q4 has its collector-base path connected to the base-emitter path of the NPN transistor Q3 in parallel, and its emitter connected to the ground node.

The resistor R8 is connected at one end to the power supply terminal 14 and at the other end to the emitter of the PNP transistor Q5. The collector of the transistor Q5 is connected to the collector of the NPN transistor Q3. The resistor R9 is provided between and connected to the base of the PNP transistor Q5 and the power supply terminal 14. The resistor R10 connects the emitter of the PNP transistor Q6 to the base of the PNP transistor Q5. The PNP transistor Q6 has its collector connected to the ground node and its base connected to the collector of PNP transistor Q5.

The PNP transistor Q7 constitutes a feedback circuit that achieves self-hold of the constant-current-source circuit 18. More specifically, the PNP transistor Q7 has its base connected to the base of the PNP transistor Q5, its emitter connected by the resistor R11 to the power supply terminal 14, and its collector connected to the base of the NPN transistor Q3.

The PNP transistor Q8 has its base connected to the base of the PNP transistor Q5, its emitter connected by the resistor R12 to the power supply terminal 14 and its collector connected to the drive-current input node of the serial-data-receiving circuit 12. The NPN transistors Q9 and Q10 have their bases connected to the base of the PNP transistor Q5. The PNP transistor Q9 has its emitter connected by the resistor R13 to the power supply terminal 14. Similarly, the NPN transistor Q10 has its emitter connected by the resistor R14 to the power supply terminal 14.

The main power-supply circuit 20 has a band-gap voltage source 201, a regulator circuit 202, and a NPN transistor Q11 for constant voltage output. The band-gap voltage source 201 generates a band-gap voltage from the constant current supplied from the collector of the PNP transistor Q9 incorporated in the constant-current-source circuit 18. The regulator circuit 202 is driven by the constant current supplied from the collector of the PNP transistor Q10 provided in the constant-current-source circuit 18. The regulator circuit 202 generates a constant voltage of, for example, 5 V from the band-gap voltage applied from the band-gap voltage source 201.

The regulator circuit 202 is connected to the constant voltage output terminal 23. The circuit 202 detects the emitter output of the NPN transistor Q11, the collector-emitter path of which is provided between and connected to the power supply terminal 14 and the constant voltage output terminal 23. In accordance with the emitter output of the NPN transistor Q11, the circuit 202 controls the base potential of the NPN transistor Q11 in a feedback manner. Note that a voltage-stabilizing capacitor 24 is connected to the constant voltage output terminal 23.

The reset circuit 22 has NPN transistor Q12 and Q13 and resistors R15 and R16. The transistor Q12 functions as a reset switch, and the transistor Q13 as a reset-invalidating switch.

A base of the NPN transistor Q12 receives a reset signal via the resistor R15 from the control circuit 21. The transistor Q12 has its emitter connected to the ground node and its collector connected to the base of the NPN transistor Q3 incorporated in the constant-current-source circuit 18. The resistor R16 is provided between and connected to the base of the transistor Q12 and the ground node. The NPN transistor Q13 has its collector-emitter path provided between and connected to the base of the transistor Q12 and the ground node. The base of the transistor Q13 is connected to the node of the resistors R4 and R5 of the buffer circuit 17.

In the reset circuit 22, the NPN transistor Q13, or reset-invalidating switch, is turned on by the potential at the node of the resistors R4 and R5 while the buffer circuit 17 is operating. When the transistor Q13 is turned on, the NPN transistor Q12, or reset switch, is turned off.

While the buffer circuit 17 is not operating, the NPN transistor Q13 remains off due to the potential at the node of the resistors R4 and R5. Hence, the NPN transistor Q12 is turned on when the reset signal is input (that is, when the reset signal rises from low level L to high level H). As a result, the NPN transistor Q3 of the constant-current-source circuit 18 is turned off.

Figure 2:
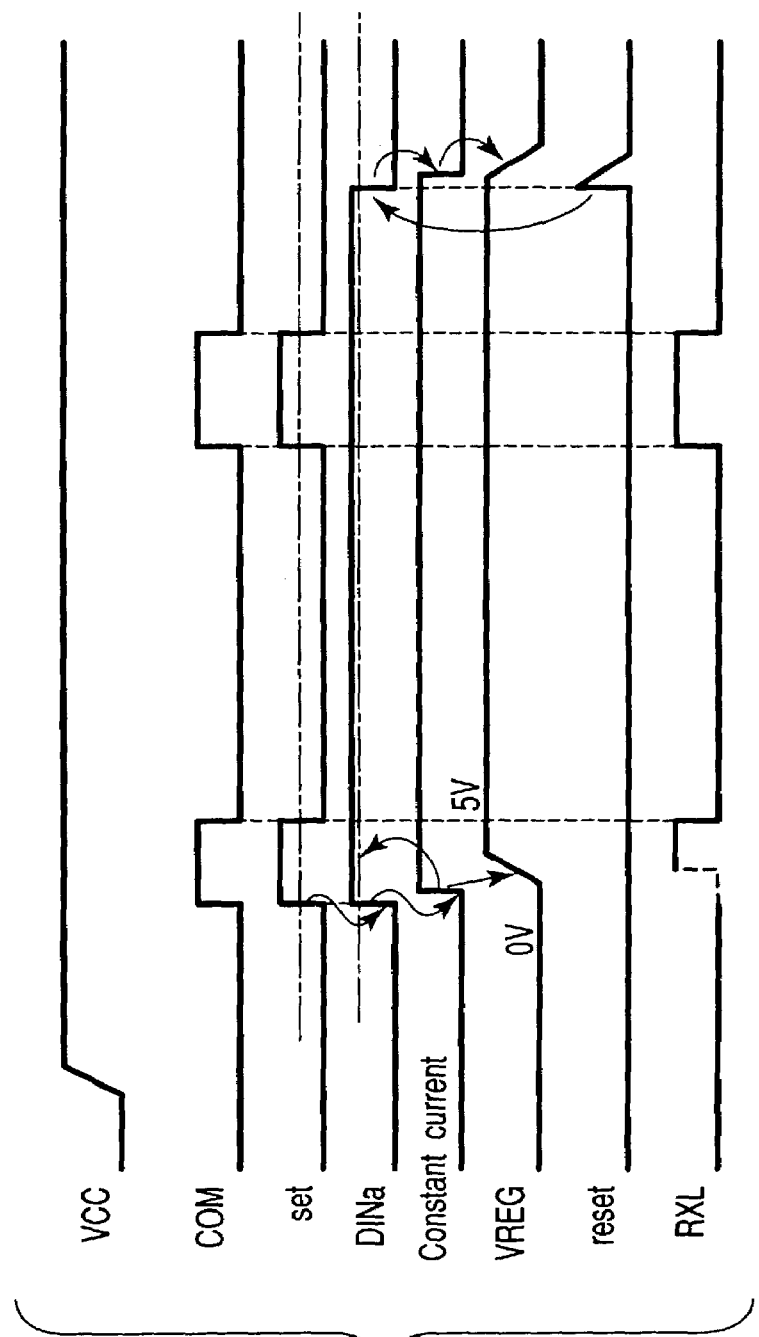
FIG. 2 is timing chart illustrating how the power-supply control apparatus of FIG. 1 operates.

FIG. 2 is timing chart illustrating how the power-supply control apparatus of FIG. 1 operates.

In the standby mode, the input signal from outside is at a potential that is too low to turn on the NPN transistor Q1 of the signal-detecting circuit 16. Hence, the signal-detecting circuit 16, buffer circuit 17, constant-current-source circuit 18, main power-supply circuit 20 and control circuit 21 remain off. In FIG. 2, "VCC" is the output voltage of the battery 15.

When the door-unlock command COM, for example, is input to the input terminal 11, the signal-detecting circuit 16 detects this command COM in the form of a set signal "set". This detection is transferred as signal DINa to the constant-current-source circuit 18 through the buffer circuit 17, and the circuit 18 starts operating (comes out of the standby mode) and a constant current flows in the constant-current-source circuit 18. Owning to the constant current, the circuit 18 self-holds the operation state. The constant current output from the circuit 18 drives the main power-supply circuit 20. When the main power-supply circuit 20 is driven, it outputs a constant voltage VREG, e.g., 5 V that is lower than the output voltage of the battery 15. The constant voltage is applied to the serial-data-receiving circuit 12, serial-data-transferring circuit 13 and control circuit 21, which are driven.

On the other hand, the control circuit 21 receives data RXL containing the door-unlock command from the serial-data-receiving circuit 12 and controls the door-unlock motor (not shown) to be driven. Upon finishing the control on the motor, the control circuit 21 outputs a reset signal "reset", which is supplied to the reset circuit 22, and thus the operating mode is back from the operation mode to the standby mode.

The reset circuit 22 turns off the constant-current-source circuit 18 upon receiving the reset signal if the externally input signal is invalid. The control circuit 21 is thereby turned off. The power-supply control apparatus is therefore set into the standby mode. If the externally input signal is valid, the NPN transistor Q13, which is a reset-invalidating switch, is on. In this case, the reset circuit 22 does not turn off the constant-current-source circuit 18 when it receives the reset signal.

While the power-supply control apparatus remains in the standby mode, the signal-detecting circuit 16 requires no backup power supplies and can yet detect a signal that changes the operating mode back to the operation mode from the standby mode. In addition, the power consumed is less than in the conventional power-supply control apparatus, because the signal-detecting circuit 16, buffer circuit 17, constant-current-source circuit 18, main power-supply circuit 20, control circuit 21 and reset circuit 22 are off.

Once the signal-detecting circuit 16 detects the signal that changes the operating mode back to the operation mode from the standby mode, the constant-current-source circuit 18 is driven to generate a constant current and self-holds the operation state owing to the generated constant current.

Thus, the circuit 18 needs no backup power supplies to hold the operation state and can drive the main power-supply circuit 20.

In the constant-current-source circuit 18, the PNP transistor Q7 serves to accomplish the self-hold of the circuit 18. Instead, a constant voltage source using the PNP transistor Q10 may be used to achieve the self-hold. Still alternatively, a circuit including a logic circuit using a constant voltage source using the PNP transistor Q10 as may be used to achieve the self-hold.

<Modification of the Embodiment>

FIG. 3 shows a modification of the power-supply control apparatus illustrated in FIG. 1.

This power-supply control apparatus differs from the embodiment shown in of FIG. 1 in that a control input terminal 31, a manual switch 32 and a control input detecting circuit 33 are provided. It is identical to the embodiment in any other respects. The components identical or similar to those shown in FIG. 1 are denoted at the same reference numerals and will not be described in detail.

The control input detecting circuit 33 has a similar structure to the signal-detecting circuit 16, but has no components equivalent to the resistors R2 and R3. Specifically, the control input detecting circuit 33 comprises resistors R17 and R18 and an NPN transistor Q14. The resistors R17 and R18 are provided between and connected to the control input terminal 31 and ground node. The NPN transistor Q14 has its base connected to the node of the resistors R17 and R18. The collector of the NPN transistor Q14 is connected to the node of the resistor R2 and the collector of the NPN transistor Q1 of the signal-detecting circuit 16. The emitter of the NPN transistor Q14 is connected to ground node.

The control input detecting circuit 33 performs almost the same function as the signal-detecting circuit 16. Specifically, when the manual switch 32 is operated, a control voltage is applied from external to the control input terminal 31. The control input detecting circuit 33 detects the control voltage. In accordance with the control voltage, the circuit 33 activates the signal-detecting circuit 16.

The power-supply control apparatus attains the same advantage as the apparatus illustrated in FIG. 1. Moreover, its operating mode can be switched back to the operation mode from the standby mode when the manual switch 32 is operated and the control voltage is applied from external to the control input terminal 31.

In the embodiment described above, the NPN transistor Q2 provided in the buffer circuit 17 and provided to receive the output of the signal-detecting circuit 16 may be replaced with a PNP transistor. Further, an N-channel MOS transistor may replace the NPN transistor Q1 that receives externally input signals in the signal-detecting circuit 16. Still further, MOS transistors can replace the bipolar transistors in the buffer circuit 17, constant-current-source circuit 18, and main power-supply circuit 20 and reset circuit 22.

This invention is not limited to the embodiment and the modification thereof, both described above. Rather, various changes and modifications can be made within the scope and spirit of the invention.

The embodiment and its modification, both specified above, are designed for use in apparatuses that lock and unlock the doors of automobiles. As indicated above, the battery 15 is, for example, a 13.5 V vehicle battery and the main power-supply circuit 20 outputs a constant voltage of 5 V. Nevertheless, the battery 15 and the circuit 20 may output 5 V and 2 to 3 V, respectively.

As has been described, the power-supply control apparatus according to this invention need not have a backup power supply that enables the signal-detecting circuit to detect a signal for changing the operating mode back to the operation mode from the standby mode to the operation mode. When the apparatus receives such a signal, the main power supply is automatically used. This saves the power of the battery. The power-supply control apparatus is therefore fit for use in apparatuses for locking and unlocking the doors of automobiles.

What is claimed is:

1. A power-supply apparatus comprising:
   an input terminal;
   a signal-detecting circuit which receives a drive power from a battery and which detects a signal input to the input terminal;
   a constant-current-source circuit which receives a drive power from the battery, which is activated by the signal detected by the signal-detecting circuit and which self-holds an operation state;
   a main power-supply circuit which receives a drive power from the battery and which operates to output a constant voltage, upon receiving a current from the constant-current-source circuit; and
   a reset circuit which turns off the constant-current-source circuit upon receiving a reset signal.

2. A power-supply control apparatus according to claim 1, in which the signal input to the input terminal is serial data transmitted, and which further comprises a data-receiving circuit which is driven by the current supplied from the constant-current-source circuit to reproduce the serial data input to the input terminal.

3. A power-supply control apparatus according to claim 2, wherein the signal-detecting circuit, constant-current-source circuit, main power-supply circuit, reset circuit and data-receiving circuit are provided in the form of a semiconductor integrated circuit, and the semiconductor integrated has an input terminal which receives the serial data and a power-supply terminal which is connected to the battery.

4. A power-supply control apparatus according to claim 1, further comprising a control circuit which is driven by the constant voltage output from the main power-supply circuit.

5. A power-supply control apparatus according to claim 4, wherein the control circuit is a logic circuit or a microcomputer.

6. A power-supply control apparatus according to claim 1, further comprising a bypass capacitor for absorbing an instantaneous input, the bypass capacitor being provided between and connected to a drive input node of the constant-current-source circuit and ground node.

7. A power-supply control apparatus according to claim 1, further comprising a control-voltage input terminal which receives a control voltage and a control-voltage detecting circuit which detects the control voltage input to the control-voltage input terminal and drives the constant-current-source circuit in accordance with the control voltage detected.

8. A power-supply control apparatus according to claim 2, further comprising a control circuit which is driven by the constant voltage output from the main power-supply circuit.

9. A power-supply control apparatus according to claim 8, in which the signal input to the input terminal is serial data transmitted, and which further comprises a data-receiving circuit which is driven by the current supplied from the constant-current-source circuit to reproduce the serial data input to the input terminal.

10. A power-supply control apparatus according to claim 9, wherein the signal-detecting circuit, constant-current-source circuit, main power-supply circuit, reset circuit and data-receiving circuit are provided in the form of a semiconductor integrated circuit, and the semiconductor integrated has an input terminal which receives the serial data and a power-supply terminal which is connected to the battery.

11. A power-supply control apparatus according to claim 9, wherein the battery is a vehicle battery, the serial data contains a door-unlock command, and the control circuit generates the reset signal after generating a control signal for driving a door-unlock motor.

12. A power-supply control apparatus according to claim 9, wherein the control circuit processes data output from the data-receiving circuit and outputs the reset signal after processing the data.

13. A power-supply control apparatus according to claim 8, wherein the control circuit is a logic circuit or a microcomputer.

14. A power-supply control apparatus according to claim 2, further comprising a bypass capacitor for absorbing an instantaneous input, the bypass capacitor being provided between and connected to a drive input node of the constant-current-source circuit and ground node.

15. A power-supply control apparatus according to claim 2, further comprising a control-voltage input terminal which receives a control voltage and a control-voltage detecting circuit which detects the control voltage input to the control-voltage input terminal and drives the constant-current-source circuit in accordance with the control voltage detected.

* * * * *